United States Patent
Kurokawa et al.

(10) Patent No.: US 7,032,085 B2
(45) Date of Patent: Apr. 18, 2006

(54) STORAGE SYSTEM WITH A DATA SORT FUNCTION

(75) Inventors: Isamu Kurokawa, Odawara (JP); Junichi Muto, Odawara (JP); Hisaharu Takeuchi, Odawara (JP); Shinichi Hiramatsu, Odawara (JP); Masaru Tsukada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 10/765,098

(22) Filed: Jan. 28, 2004

(65) Prior Publication Data

US 2005/0144168 A1 Jun. 30, 2005

(30) Foreign Application Priority Data

Dec. 25, 2003 (JP) .............................. 2003-428718

(51) Int. Cl.
*G06F 13/00* (2006.01)
(52) U.S. Cl. ...................... 711/154; 711/111; 711/112; 711/113; 711/118; 711/164
(58) Field of Classification Search .................. None
See application file for complete search history.

(56) References Cited

U.S. PATENT DOCUMENTS

| | | | |
|---|---|---|---|
| 5,343,427 A | | 8/1994 | Teruyama |
| 5,652,857 A | | 7/1997 | Shimoi et al. |
| 5,659,733 A | * | 8/1997 | Yamashita ..................... 707/7 |
| 5,813,004 A | * | 9/1998 | Meck et al. .................... 707/7 |
| 5,860,083 A | | 1/1999 | Sukegawa |
| 5,903,780 A | * | 5/1999 | Fushimi ...................... 712/300 |
| 6,021,407 A | * | 2/2000 | Meck et al. .................... 707/7 |
| 6,035,296 A | * | 3/2000 | Fushimi ......................... 707/7 |
| 6,105,024 A | * | 8/2000 | Graefe et al. .................. 707/7 |
| 6,182,071 B1 | * | 1/2001 | Fushimi ......................... 707/7 |
| 6,230,220 B1 | | 5/2001 | Cohen et al. |

(Continued)

FOREIGN PATENT DOCUMENTS

JP  8-272592  3/1995

(Continued)

*Primary Examiner*—Mano Padmanabhan
*Assistant Examiner*—Jasmine Song
(74) *Attorney, Agent, or Firm*—Reed Smith LLP; Stanley P. Fisher, Esq.; Juan Carlos A. Marquez, Esq.

(57) ABSTRACT

A storage system, which can execute sort processing of data without affecting online service, is disclosed. A storage control device 12 receives a sort instruction specifying a record group for sorting and a sort key from a host device 1, reads the record group from an external storage device 11 into cache memory 123, and uses the cache memory 123 and a work area secured in the external storage device 11 to execute sort processing of the above record group, and again stores the sorted record group in a prescribed output area within the external storage device 11. When a plurality of sort instructions are received, work areas are allocated automatically without overlapping work areas. When record updates occur during online service, a snapshot of the updated records is taken, and sorting of the snapshot is performed.

9 Claims, 12 Drawing Sheets

U.S. PATENT DOCUMENTS

| | | |
|---|---|---|
| 6,424,970 B1 | 7/2002 | Arakawa et al. |
| 6,571,244 B1 | 5/2003 | Larson |
| 6,601,067 B1 * | 7/2003 | Hiyoshi ......................... 707/7 |
| 2002/0065793 A1 | 5/2002 | Arakawa et al. |
| 2003/0061407 A1 | 3/2003 | Kurokawa et al. |
| 2003/0163457 A1 | 8/2003 | Yano et al. |
| 2004/0039869 A1 | 2/2004 | Kurokawa et al. |
| 2004/0098538 A1 | 5/2004 | Horn et al. |
| 2004/0098543 A1 | 5/2004 | Araki et al. |
| 2004/0205303 A1 | 10/2004 | Naveh et al. |

FOREIGN PATENT DOCUMENTS

| | | |
|---|---|---|
| JP | 10-78967 | 9/1996 |

* cited by examiner

FIG. 3

| | PARAMETER TYPE | DESCRIPTION | |
|---|---|---|---|
| 1 | SORT-IN ADDRESS | ADDRESS OF LOGICAL DEVICE FOR SORTING | 301 |
| 2 | SORT RANGE (STARTING TRACK NUMBER ENDING TRACK NUMBER) | RANGE IN WHICH BLOCK GROUP FOR SORTING EXISTS IN THE ABOVE LOGICAL DEVICE (DATASET FOR SORTING) | 302 |
| 3 | SORT KEY | VALUE OF KEY ON WHICH TO PERFORM SORTING | 303 |
| 4 | KEY POSITION | POSITION AT WHICH SORT KEY EXISTS IN BLOCK | 304 |
| 5 | SORT-OUT ADDRESS | ADDRESS OF LOGICAL DEVICE IN WHICH THE SORTED DATA BLOCK GROUP IS TO BE STORED | 305 |
| 6 | SORT-OUT RANGE (STARTING TRACK NUMBER, ENDING TRACK NUMBER) | RANGE IN WHICH SORTED BLOCK GROUP IS TO BE STORED IN THE ABOVE LOGICAL DEVICE (SORT-OUT DATASET) | 306 |
| 7 | SORT-WORK ADDRESS | ADDRESS OF LOGICAL DEVICE FOR USE AS WORK AREA FOR SORT PROCESSING | 307 |
| 8 | SORT-WORK RANGE (STARTING TRACK NUMBER, ENDING TRACK NUMBER) | RANGE OF BLOCK GROUP USED AS WORK AREA IN THE ABOVE LOGICAL DEVICE (SORT-WORK DATASET) | 308 |
| 9 | SORT DIRECTION | DIRECTION OF SORT ORDER (ASCENDING, DESCENDING, ETC) | 309 |

FIG. 4

| | PARAMETER TYPE | DESCRIPTION | |
|---|---|---|---|
| 1 | SORT-IN ADDRESS | ADDRESS OF LOGICAL DEVICE FOR SORTING | 401 |
| 2 | SORT RANGE (STARTING TRACK NUMBER ENDING TRACK NUMBER) | RANGE IN WHICH BLOCK GROUP FOR SORTING EXISTS IN THE ABOVE LOGICAL DEVICE (DATASET FOR SORTING) | 402 |
| 3 | SORT-OUT ADDRESS | ADDRESS OF LOGICAL DEVICE IN WHICH THE SORTED DATA BLOCK GROUP IS TO BE STORED | 403 |
| 4 | SORT-OUT RANGE (STARTING TRACK NUMBER, ENDING TRACK NUMBER) | RANGE IN WHICH SORTED BLOCK GROUP IS TO BE STORED IN THE ABOVE LOGICAL DEVICE (SORT-OUT DATASET) | 404 |
| 5 | SORT-WORK ADDRESS | ADDRESS OF LOGICAL DEVICE FOR USE AS WORK AREA FOR SORT PROCESSING | 405 |
| 6 | SORT-WORK RANGE (STARTING TRACK NUMBER, ENDING TRACK NUMBER) | RANGE OF BLOCK GROUP USED AS WORK AREA IN THE ABOVE LOGICAL DEVICE (SORT-WORK DATASET) | 406 |
| 7 | SORT KEY | VALUE OF KEY ON WHICH TO PERFORM SORTING | 407 |
| 8 | KEY POSITION | POSITION AT WHICH SORT KEY EXISTS IN BLOCK | 408 |
| 9 | SORT DIRECTION | DIRECTION OF SORT ORDER (ASCENDING, DESCENDING, ETC) | 409 |

STORAGE SYSTEM WITH A DATA SORT FUNCTION

CROSS REFERENCES TO RELATED APPLICATION

This application relates to and claims priority from Japanese Patent Application No. 2003-428718 filed on Dec. 25, 2003, the entire disclosure of which is incorporated herein by reference.

BACKGROUND OF THE INVENTION

1. Field of the Invention

This invention relates to a storage system, generally connected to a host device, which performs data input/output online in response to instructions from the host device, and in particular relates to a technique for sorting data accumulated in the storage system.

2. Description of the Related Art

In an information processing system having a host device and a storage system which performs input and output of data online with the host device, as the number of accesses of data within the storage system by the host device increases, the order of arrangement of data within the storage system is gradually disrupted. The execution as necessary of processing to sort data within the storage system, organizing the data according to certain key information, prevents a decline in the speed of data retrieval in the storage system and is important for maintaining a high speed in data input/output from and to the host device. For example, in a bank information system, sort processing to organize customer account data according to, for example, account numbers, customer names or other key information, must be performed at appropriate times.

In the database processing system disclosed in Japanese Patent Laid-open No. 8-272592, a host processing device is connected to a data processing device which performs database processing and a disk device which stores data. The data processing device incorporates a database processing device and a sort processing device, and by this means sort processing and database processing can be performed in parallel. After the end of sort processing, the host processing device performs batch reads of sorted data from the data processing device, and outputs this data to the disk device.

At present storage system capacities are expanding, and the number of backup and sort operations to be performed are increasing. In particular, sort processing employing conventional technology is accompanied by frequent input/output operations between the host device and the storage system. As the number of sort operations increases, the number of input/output operations between the host device and the storage system grows. As a result, there is congestion of the communication channel between the host device and the storage system, the efficiency of use of cache memory in the storage system declines, time loss and other problems arise due to contention for access of the same physical storage devices (for example, hard disk drives) within the storage system, and the time required for input/output processing lengthens. As a result, in addition to the increased time required for the sort operation itself, there is an increase in the time required for backup processing. In general, sort processing and backup processing are performed at nighttime or other times when online service is halted, in order not to affect online service. Even so, however, if the time required for data sorting and backup processing is further lengthened, so that for example the time for resumption of online service is delayed, there is the danger of seriously impeding the operation of the information processing system. Particularly in the case of 24-hour online service, there is a need for technology enabling execution in parallel of sort processing without affecting data input/output in online transactions.

SUMMARY OF THE INVENTION

An object of this invention is to improve the performance of sort processing in a storage system.

A further object of this invention is to provide control technology such that even if there is an increase in the number of sort operations, the number of input/output operations between the host device and the storage system does not increase.

A further object of this invention is to provide control technology to improve the efficiency of use of cache memory in a storage system.

A further object of this invention is to provide technology to reduce contention for access of physical storage devices within the storage system.

A further object of this invention is to provide technology enabling the execution in parallel of sort processing, without substantially affecting data input/output in online transactions.

A storage system according to one aspect of this invention comprises an external storage device, connectable to one or more host device via a communication channel and having one or more physical devices which store data for input from and output to the above host devices, and a storage control device, between the above host devices and the above external storage device, which controls transfer of the above data. The above storage control device has cache memory, which temporarily holds one or more blocks of the above data; control information memory, which stores control information; and a control portion which is connected to the above host devices, the above external storage device, the above cache memory, and the above control information memory, defines each of one or more sets of blocks of the above data stored in the above external storage device as one or more logical devices, and controls the input and output of the above blocks between the above external storage device, the above cache memory, and the above host devices. The above control portion has one or more processors which receive sort processing instructions from the above host devices and perform sort processing; the above one or more processors is notified, by the above sort processing execution instructions, of sort-in information specifying an arbitrary block group in an arbitrary logical device as a sort-in block group, key information specifying data at an arbitrary position in the above block as a sort key, sort-work information specifying an arbitrary block group in an arbitrary logical device as a sort-work block group, and sort-out information specifying an arbitrary block group in an arbitrary logical device as a sort-out block group. When the above one or more processors execute the above sort processing in response to the above sort processing execution instruction, the above specified sort-in block group in the above external storage device is written to the above cache memory, and while using the above specified sort-work block group as a work area, the above sort-in block group written to the above cache memory is sorted based on the above specified sort key value, the above sorted sort-in block group is stored in the above specified sort-out block group, and the above host devices are notified of completion of the above sort processing.

By means of this storage system, simply through the issue of a sort processing execution instruction to the storage control device by a host device, the storage control device sorts the specified block group according to the specified key value in accordance with the sort processing execution instruction, and after sorting stores the blocks in the specified block group.

One aspect of the above storage system further comprises management equipment, connected to the above control portion, and capable of visually displaying the input/output information of the above control information memory. The above one or more processors are configured so as to be able to receive the above sort processing execution instruction from the above management equipment as well as from the above host devices, and to perform the above sort processing.

In one aspect of the above storage system, the above sort-in information comprises a sort-in address which indicates the address of the logical device in which the above sort-in block group exists, and a sort range which indicates the location range of existence of the above sort-in block group within the above logical device identified by the above sort-in address. The above sort-work information comprises a sort-work address indicating the address of the logical device in which the above sort-work block group exists, and a sort-work range indicating the location range of existence of the above sort-work block group in the above logical device identified by the above sort-work address. And the above sort-out information comprises a sort-out address indicating the address of the logical device in which the above sort-out block group exists, and a sort-out range indicating the location range of existence of the above sort-out block group in the above logical device identified by the above sort-out address.

In one aspect of the above storage system, when the above sort-work information transmitted by the above sort processing execution instruction has an invalid value, the above one or more processors secure in the above cache memory a substitute storage area for the sort-work block group specified by the above sort-work information, and uses the above substitute storage area in the above cache memory as the above work area.

One aspect of the above storage system further comprises management equipment, connected to the above control portion, which can visually display the input/output information of the above control information memory. The above management equipment is able to output to the above control portion a reservation instruction, specifying an arbitrary logical device or an arbitrary block group within an arbitrary logical device as a reserved area to be secured in advance for use as the above work area. The above one or more processors, in response to the above reservation instruction from the above management equipment, store access prohibition information for the above reserved area specified by the above reservation instruction in the above control information memory, and based on the above access prohibition information in the above control information memory, limits data input/output from the host devices in the above reserved area; and when a plurality of the above sort processing execution instructions are received, specifying mutually overlapping sort-work block groups, the above reserved area is used as a substitute for one of the above mutually overlapping sort-work block groups. By this means, a plurality of sort operations can be executed simultaneously.

In this aspect, the above one or more processors monitor the state of use through the data input/output of the above one or more physical devices in the above external storage device, and store physical device usage information, indicating the usage load of the above one or more physical devices, in the above control information memory. When the above plurality of reserved areas are already secured, and the above one or more processors select from among the above plurality of reserved areas for use as the above substitute, a logical device is selected which exists in a physical device with a relatively low value of the above usage load from among the above plurality of reserved areas, based on the above physical device usage information stored in the above control information memory. By this means, physical device usage loads in the external storage device can be rendered uniform, and input/output processing capacities can be balanced.

In one aspect of the above storage system, each of the blocks in the above logical devices has a unique ID. In sort processing of the above sort-in block group in the above external storage device, the above one or more processors write the above sort-work block group or the above sort-out block group without modifying the IDs of the sorted blocks in the above sort-in block group. During execution of or after completion of the sort processing of the above sort-in block group, when the above one or more processors updates the data of any of the blocks in the above sort-in block group within the above external storage device during online service by the above host devices, online sort processing is executed for the above blocks to be updated during the above online service. In this online sort processing, the above one or more processors write the above blocks to be updated at the positions after sorting within the above sort-work block group or the above sort-out block group, and, based on the above IDs of the above blocks to be updated, retrieve and delete blocks remaining at the positions prior to sorting of the above updated blocks from within the above sort-work block group or the above sort-out block group.

In one aspect of the above storage system, when performing sort processing of the above sort-in block group in the above external storage device, the above one or more processors record, in the above control information memory, block position correspondence information which indicates the association between the positions within the above storage system of each of the blocks in the above sort-in block group, and the positions in the above storage system of each of the blocks in the above sort-work block group or the above sort-out block group corresponding to each of the blocks in the above sort-in block group. And, during execution of or after the completion of sort processing of the above sort-in block group, when block data in any of the blocks of the above sort-in block group within the above external storage device is updated during online service by the above host devices, the above one or more processors executes online sort processing for the above blocks to be updated during the above online service. In this online sort processing, the above one or more processors write the above blocks to be updated to the positions after sorting in the above sort-work block group or in the above sort-out block group, and based on the above block position correspondence information, retrieve and delete the blocks remaining in the positions before sorting of the above updated blocks from within the above sort-work block group or the above sort-out block group, and also update the above block position correspondence information such that the positions of the above blocks to be updated in the above sort-work block group or the above sort-out block group from the positions before sorting to the positions after sorting.

In one aspect of the above storage system, the above one or more processors create a copy of an arbitrary logical device, and after the creation of the above copy, when updating a block within the original logical device during online services of the above host devices, perform processing to reflect, in the block of the above copy, the update of the above block in the above original logical device during the above online service. Further, the above one or more processors regard the block group within the above copy as the above sort-in block group, and thereafter, when an update of the above block in the above original logical device is to be reflected in the block in the above copy during the above online service, execute sort processing for the block in the above copy reflecting the above update during the above online service.

A storage system according to another aspect of this invention comprises an external storage device, connectable to one or more host devices via a communication channel and which stores data for input/output by the above host devices, and a storage control device which controls transfer of the above data between the above host devices and the above external storage device. The above storage control device has shared memory which can be used for other prescribed applications, and a control portion which is connected to the above host devices, the above external storage device and the above shared memory, and controls the data input/output of the above external storage device, the above host devices and the above shared memory. The above control portion has one or more processors which receive sort processing execution instructions from the above host devices and perform sort processing; the above one or more processors perform sort processing to select a first storage area within the above external storage device as a sort-in area, select a second storage area within the above external storage device or the above shared memory as a sort-work area, select a third storage area within the above external storage device as a sort-out area, use the above sort-work area to sort the data in the above sort-in area, and store the sorted data in the above sort-out area.

By means of preferred aspects of this invention, sort processing performance in storage systems can be improved.

By means of preferred aspects of this invention, it is possible to ensure that even if the number of sort operations increases, there is no large increase in the number of input/output operations between host devices and the storage system.

By means of preferred aspects of this invention, the usage efficiency of cache memory in the storage system can be improved.

By means of preferred aspects of this invention, access contention for physical storage devices in the storage system can be decreased.

By means of preferred aspects of this invention, sort operations can be executed in parallel, without greatly affecting data input/output in online transactions.

BRIEF DESCRIPTION OF THE DRAWINGS

FIG. 3 shoes an example of a parameter set 30 necessary for sort processing defined by a user;

FIG. 4 shows an example of a parameter set 40 created by a host device based on the parameter set 30 of FIG. 3;

DESCRIPTION OF THE PREFERRED EMBODIMENTS

Figure 1:
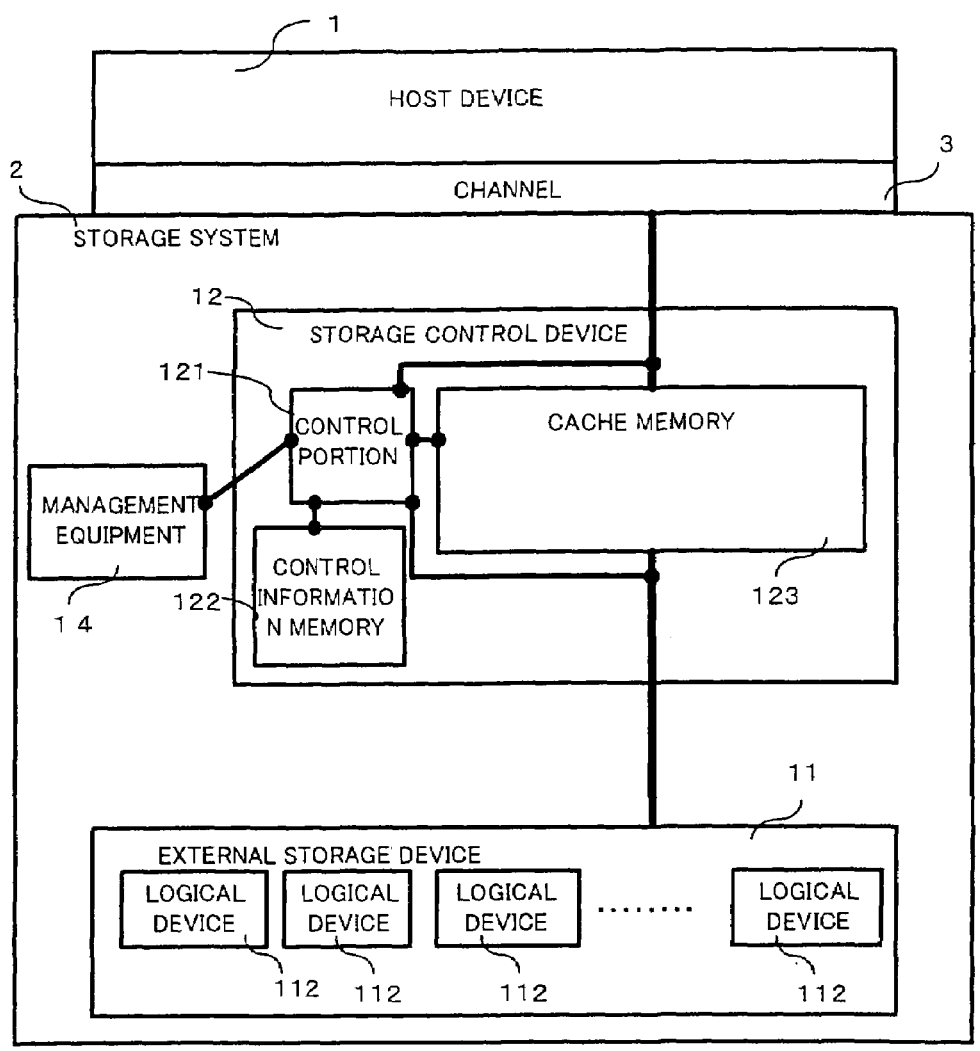
FIG. 1 shows the overall configuration of an information processing system using a storage system of one aspect of this invention.

Information processing systems of aspects of this invention are explained in detail, referring to the drawings.

FIG. 1 shows the overall configuration of an information processing system using a storage system of one aspect of this invention.

The information processing system shown in FIG. 1 comprises a host device 1 which performs information processing such as, for example, business information processing, and a storage system 2, connected to the host device 1, which accumulates data used by the host device 1 and performs data input/output to and from the host device 1 in response to instructions from the host device 1. In the example of FIG. 1, one host device 1 is connected to the storage system 2; but a plurality of host devices 1 may be connected to the storage system 2. The host device 1 and storage system 2 are connected to enable communication via a channel 3 for data, data access instructions, and other input/output control therebetween. The storage system 2 comprises an external storage device 11 and a storage control device 12. The external storage device 11 has one or a plurality of (typically numerous) physical storage devices (for example, hard disk drives; hereafter called "physical devices") (not shown in the figure) to accumulate data. The storage control device 11 has functions for processing data access instructions and various other instructions from the host device 1, for control of data transfer between the external storage device 13 and the host device 1, and for processing to sort data in the external storage device 11 according to the principle of this invention.

The storage control device 12 has a control portion 121, with various control functions, described below; control information memory 122, which stores information for various control used by the control portion 121; and cache memory 123, which temporarily stores data input and output by the external storage device 11 and host device 1. The control portion 121 is connected to enable communication with the channel 3, control information memory 122, cache memory 123, and external storage device 11. The control portion 121 is also connected to management equipment 14 (for example, a personal computer, used for the purpose of monitoring the state of, maintaining and inspecting the storage system 2). The control portion 121 has functions to receive and interpret data access instructions (read instructions, write instructions, and similar) from the host device 1, to return appropriate responses to the host device 1, to write to the cache memory 123 the write data received from the host device 1, to transfer the write data written to the cache memory 123 to the external storage device 11, to acquire read data indicated by the host device 1 from the external storage device 11 and write the data to the cache memory 123, to send read data written to the cache memory 123 from the cache memory 123 to the host device 1, and to perform control related to other data input/output processing with the host device 1. Further, upon receiving and interpreting the data sort instruction from the host device 1 and returning the appropriate response to the host device 1, the control portion 121 has functions for control related to data sorting, including the performance of sort processing of data as described below in detail according to the data sort instruction received from the host 1. The control portion 121 can also control data sorting in response to a data sort instruction from the management equipment 14 in addition to data sort instructions from the host device 1. Apart from the above functions, the control portion 121 also has various functions for data protection, backup, and other operations, but explanations of these functions are omitted from this specification. The control portion 121 has one or a plurality (typically numerous) programmed microprocessors (not shown in the figure); each of these microprocessors performs a share of processing for the above-described various control.

Various control information, used by the control portion 21 (for example, read, written, or modified) while the control portion 21 performs the above-described control of data input/output processing, control of data sort processing, and other control, is stored in the control information memory 122. In particular, control information used in control related to data sort processing is described in detail below.

The control portion 121 has functions to convert physical storage areas in the external storage device 11 into logical storage areas, and to convert logical storage areas into physical storage areas. The control portion 121 uses these physical/logical storage area conversion functions to define one or a plurality of (typically numerous) logical storage devices (hereafter called "logical devices") 112 in storage areas of the external storage device 11. The control portion 121 provides the host device 1 with a communication interface based on logical devices 112, so as to enable the host device 1 to issue data input/output instructions to and from a desired logical device 112.

The management equipment 14 has functions for input to and output from the control information memory 122, for visual display of input/output information to and from the control information memory 122, and similar.

Figure 2:
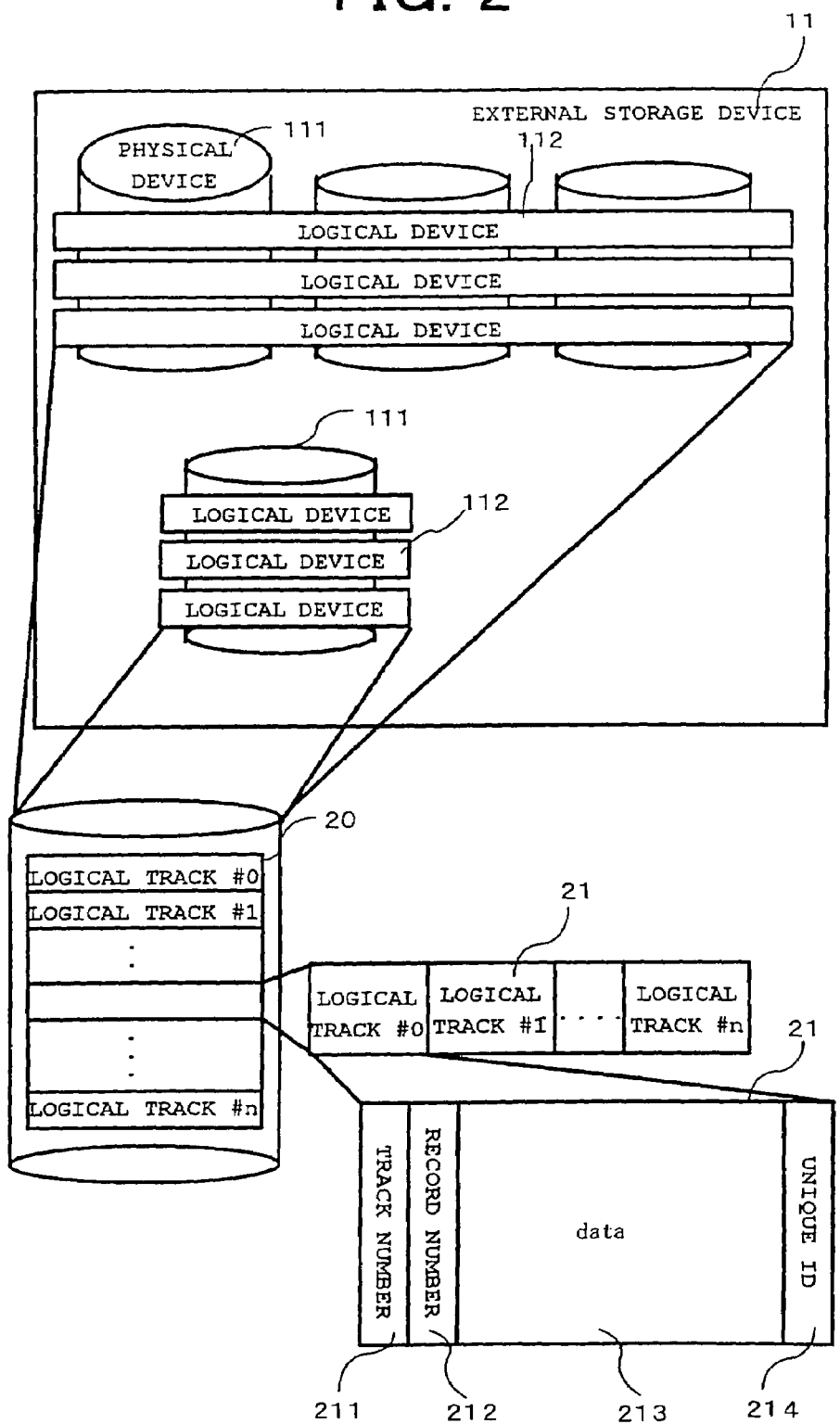
FIG. 2 shows the configuration of the external storage device 11, and in particular the relation between physical devices 111 and logical devices 112 and the detailed configuration of the logical devices 112.

FIG. 2 shows the configuration of the external storage device 11, and in particular the relation between physical devices 111 and logical devices 121 and the detailed configuration of logical devices 121.

As shown in FIG. 2, the external storage device 11 has one or a plurality of (typically numerous) physical devices 131. The above-described control portion 121 defines one or a plurality of (typically numerous) logical devices 112 in the storage areas provided by these physical devices 131. The logical devices 112 can be defined in the form of division of the storage area of one physical device into logical ranges for control. Or, logical devices 112 can be defined in the form of division of the storage areas of two or more grouped physical devices into logical ranges for control, for example, comprising areas dispersed among two or more physical devices 111, according to the RAID principle. Data for input and output by the host device 1 is managed by the control portion 121 for each logical device 112.

In general, one logical device 112 is divided into small logical ranges for control, and each of the divided areas is defined as a logical track 20. One logical track 20 is divided into still smaller logical ranges (typically the smallest units) for control, and each of these divided areas is defined as a record 21. Data input/output instructions transmitted by the host device 1 to the storage control device 12 identify the data for input/output by specifying the address of the logical device 112 on which the data for input/output exists, the number of the logical track 20 (track number), and the number of the record 21 (record number). Data for input/output according to an instruction from the host device 1 is normally stored in cache memory 123 and a physical device 111 in units of records 21 by logical tracks 20.

Information defining all the logical devices 112, tracks 20, and records 21 in the external storage device 13 is recorded in the control information memory 122 by the control portion 121. Also, the control portion 121 monitors the state of use of each of the physical devices 111 in the external storage device 13, and records the information on the state of use of physical devices 111 thus obtained in the control information memory 122.

Below, details of data sort processing in this aspect are explained. To facilitate understanding, in the following explanation a logical device defined within a single physical device in the external storage device 13 is taken as an example. When a so-called RAID configuration is adopted, in which a single logical device spans a plurality of grouped physical devices, the state of use of the logical device is ascertained from the states of use of each of the physical devices comprised by the logical device. Hence from the following explanation of sort processing for the example of a single physical device, sort processing in a RAID configuration can also be easily understood by a practitioner of the art. Also, this invention does not limit the sort algorithm necessary for actual data sorting, and the various sort algorithms in general use in information processing technology can be employed. A sort program to perform a sort algorithm can for example be incorporated into a program in a microprocessor within the control portion 121.

First, operation in which the host device 1 instructs the storage control device 12 of the storage system 2 to perform sort processing is explained.

A sort program which executes sort processing is installed in the host device 1. A user starts the sort program and uses a prescribed job control language (JCL) to create sort job data to instruct the sort program to initiate a sort job as, for example, a batch operation. In creating this sort job data, the user defines a set of a plurality of various parameters, necessary for execution of sort processing. FIG. 3 shows an example of the types of parameters in a set 30 which can be defined by a user. As shown in FIG. 3, a set 30 of the following types of parameters 301 to 309 are comprised by sort job data.

(1) Sort-In Address

The sort-in address is the address of the logical device for sorting.

(2) Sort Range

The sort range is the range within which the block group (data set) for sorting exists within the logical device specified by the sort-in address. The sort range is specified by, for example, a starting track number and an ending track number.

(3) Sort Key

The sort key is the value of the key (field) used as the basis for sorting.

(4) Key Position

The key position is the position at which the sort key exists in a block.

(5) Sort-Out Address

The sort-out address is the address of the logical device in which a data block group which has been sorted is stored.

(6) Sort-Out Range

The sort-out range is the range in which a block group sorting of which has ended (a sort-out data set) is stored within a logical device specified by a sort-out address. The sort-out range is specified by, for example, a starting track number and an ending track number.

(7) Sort-Work Address

The sort-work address is the address of the logical device used as the work area for sort processing.

(8) Sort-Work Range

The sort-work range is the range in which a block group used as the work area (a sort-work data set) is stored in the logical device specified by the sort-work address. The sort-out range is specified by, for example, a starting track number and an ending track number.

(9) Sort Direction

The sort direction is the direction of the order of arrangement of sorted data; as the sort direction, for example, ascending order or descending order is specified.

When a parameter set 30 such as described above is defined by the host device 1, sort job data comprising the parameter set 30 is entered, and the OS of the host device 1 uses the sort job data to start the sort program. On receiving the sort job data, the sort program of the host device 1 instructs the storage control device 12 of the storage system 2 to execute sort processing. The storage control device 12 performs sort processing according to this instruction.

Figure 5:
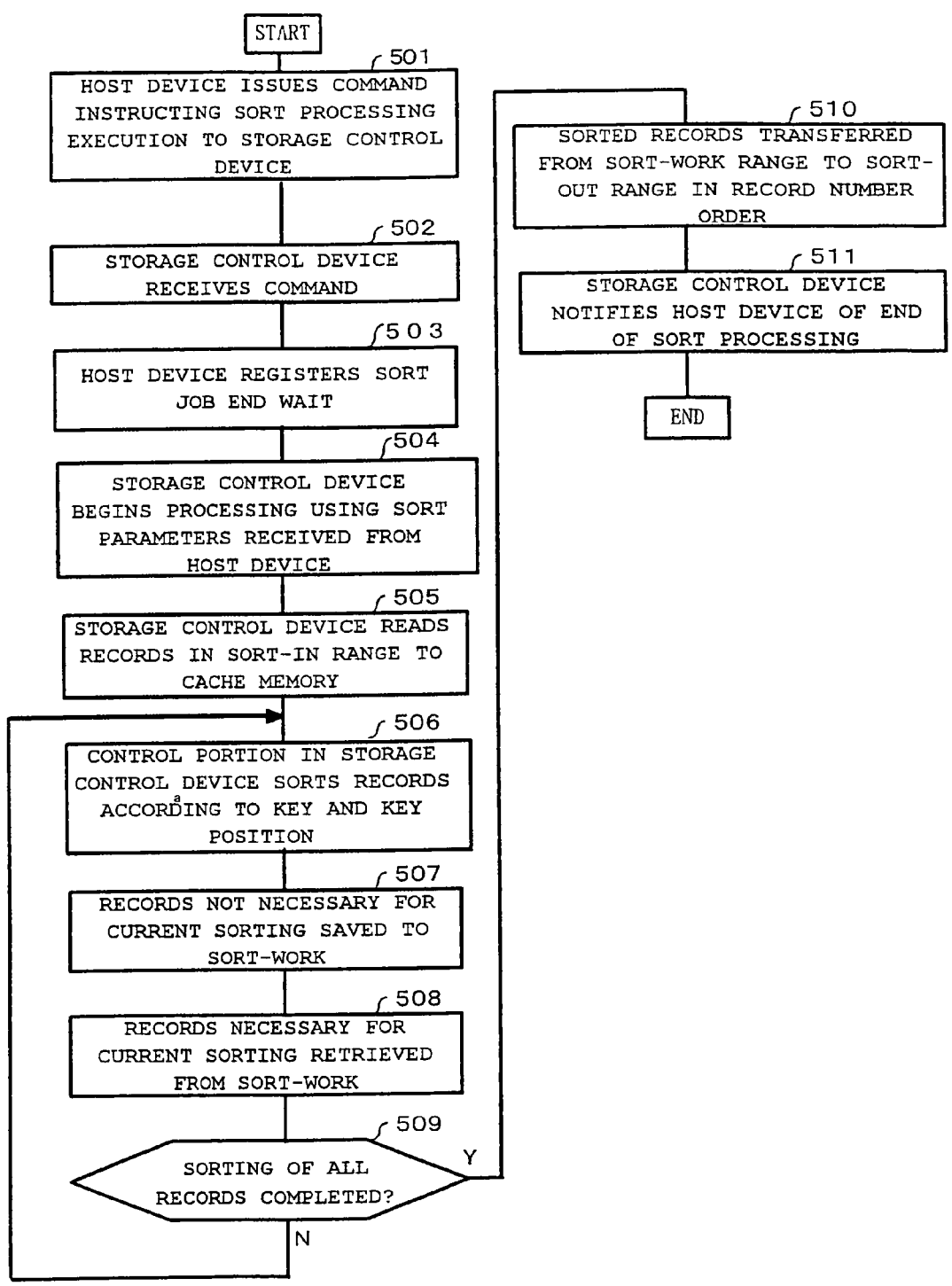
FIG. 5 shows the flow of control when a host device 1 issues an instruction to the storage control device 12 for execution of sort processing and sort processing is executed by the storage control device 12.

FIG. 5 shows the flow of control when the host device 1 issues an instruction to the storage control device 12 for execution of sort processing, and sort processing is executed by the storage control device 12.

In step 501 of FIG. 5, the sort program of the host device 1 processes the sort job data in the above-described JCL to generate a parameter set 40, an example of which is shown in FIG. 4. This parameter set 40 comprises parameters with the same contents as the parameter set 30 defined by the user and shown in FIG. 3. The sort program of the host device 1 issues a command specifying sort processing execution to the storage control device 12 of the storage system 2. In step 502, the storage control device 12 receives the command specifying sort processing execution, and receives the parameter set 40 from the host device 1. In step 503, the host device 1 registers the wait state of the sort job, and awaits notification of the end of the sort job from the storage control device 12. However, after simply registering the job end wait state, the host device 1 can execute online service or other processing while waiting.

In step 504, the storage control device 12 analyzes the parameter set 40, and ascertains the values of parameters such as the specified sort-in address 401, the sort range 402, the sort-out address 403, the sort-out range 404, the sort-work address 405, the sort-work range 406, the key 407, the key position 408, and the sort direction. The control portion 121 in the storage control device 12 then initiates sort processing according to the values of the parameters thus ascertained.

In step 505 of sort processing, the plurality of records 21 existing within the sort range 402 in the sort-in address 401 specified in the external storage device 13 are transferred to cache memory 123. In step 506, the control portion 121 sorts the plurality of records 21 for sorting which have been transferred to cache memory 123 from the sort range 402 of the sort-in address 401, according to the specified key 407 and key position 408. In step 507, the control portion 121 saves records 21 not necessary for current sort processing 123 by writing to the sort-work range 406 in the specified sort-work address 405 from cache memory 123. In step 508, records 21 which were previously saved to the sort-work range 406 of the sort-work address 405, but have become necessary for current sort processing, are read again from the sort-work range 406 to the cache memory 123.

In step 509, the control portion 121 judges whether sorting has been completed for all the records 21 to be sorted; if sorting is not complete, control returns to step 506, and similar sorting is performed for unsorted records 21. If on the other hand sorting is judged to be completed in step 509, control proceeds to step 510. In step 510, records 21 in cache memory 123 for which sorting is completed and records 21 saved to the sort-work range 406 of the sort-work address 405 are transferred to the sort-out range 404 of the sort-out address 403, in track number order starting from the beginning track number to the final track number. When storage of all the sorted records in the sort-out range 404 is completed, control proceeds to step 511, the storage control device 12 notifies the host device 1 of the end of the sort job, and the host device 1 erases the registered sort job end wait state.

As is seen from the above explanation, until the completion of sort processing the positions of records 21 being sorted can be indicated through positions in the sort-out address 403 and sort-out range 404 or in the sort-work address 405 and sort-work range 406.

The storage control device 12 can be made to perform sort processing by an instruction from the management equipment 14 as well as from the host device 1. In this case, control can be explained by replacing the host device 1 with the management equipment 14 in the above explanations referring to FIG. 3 through FIG. 5.

Through the above control, sort processing is performed within the storage system 2, without using the host device 1 or the channel 3. Consequently even if the number of sort operations increases, there is no increase in the number of input/output operations between the host device 1 and the storage system 2.

In the above explanation, the address of the logical device 112 (the sort-work address 405) and the block range (sort-work range 406) used as the work area for sort processing within the storage system 2 are specified by the host device 1, the management equipment 14, or some other external equipment. However, a case may occur in which the sort-work address 405 and sort-work range 406 specified by the host device 1 or management equipment 14 are invalid (for example, [the area] does not actually exist or is currently used for a different purpose and so cannot be allocated as a work area). In such a case, the storage control device 12 of the storage system 2 can automatically secure a work area for use in sort processing. That is, in such a case the storage control device 12 can automatically execute processing to secure an unused area in for example cache memory 123 as a work area for sort processing and to own the area as a work area until sort processing ends.

Figure 6:
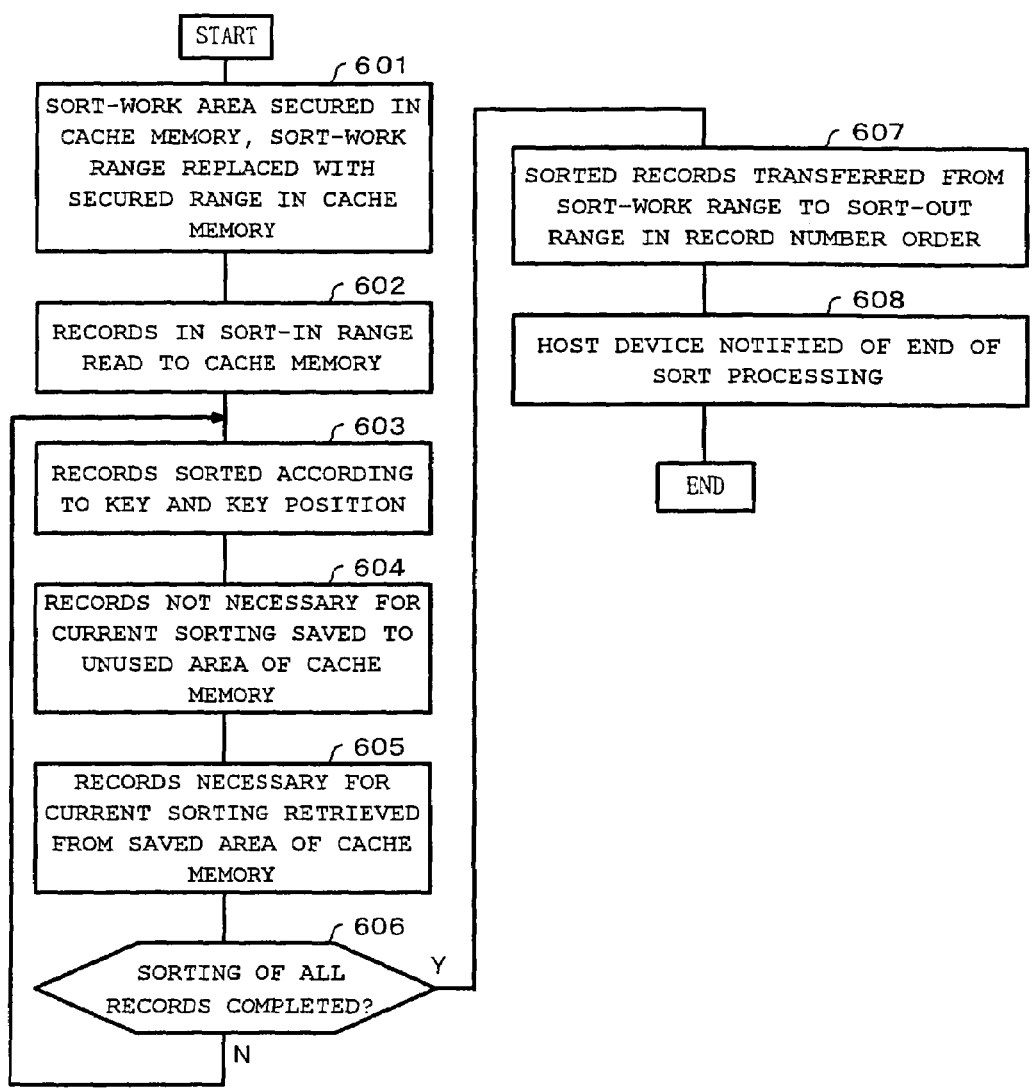
FIG. 6 shows the flow of control when the storage control device 12 automatically secures a work area for sort processing.

FIG. 6 shows the flow of processing when the storage control device 12 automatically secures a work area for sort processing.

In the control described in FIG. 6, when the sort-work address 405 and sort-work range 406 specified by the host device 1, management equipment 14 or other external equipment are invalid, in step 601 initiated by the control portion 121 of the storage control device 12, the control portion 121 secures an unused area in cache memory 123, of size greater than the data capacity of the sort range 402 of the sort-in address 401 specified by the external equipment, as the work area for sort processing, and substitutes the sort-work range 406 for the position information of the work area secured in the cache memory 123. The control portion 121 then begins sort processing.

In step 602 of sort processing, records 21 existing in the sort range 402 of the specified sort-in address 401 in the external storage device 13 are read to the sort-work area 406 (work area) in cache memory 123. In step 603, the control portion 121 sorts the records 21 read into the sort-work range 406 of the cache memory 123 according to the specified key 407, key position 408, and sort direction 409. In step 604, records 21 in the work area of cache memory 123 which are no longer necessary for the current sort processing are saved to the unused area of the sort-work range of the cache memory 123. In step 605, records 21 which had previously been saved to the unused area of the sort-work range 406 in cache memory 123, but have become necessary for current sorting, are again restored, and are incorporated into the records 21 currently for sorting in the sort-work range 406. In step 606, a judgment is made as to whether sorting is completed, and if sorting is not completed, control returns to step 603. If however sorting has been completed, control proceeds to step 607. In step 607, sorted records 21 in the sort-work range 406 of cache memory 123 are transferred to the sort-out range 404 of the sort-out address 403 in track number order, from the beginning track number to the final track number. At this time, records with the data quantity of the sort range 402 of the sort-in address 401, existing in the sort-work range 406 in cache memory 123, are transferred to the sort-out range 404. After completion of output, control proceeds to step 608, and a sort job ending notification is sent to the host device 1 or management equipment 14; the host device 1 or management equipment 14 then erases registration of the sort job end wait state.

Through the above control, cache memory 123 is automatically utilized as the work area for sort processing, and the efficiency of use of the cache memory 123 is improved. Also, access contention for physical devices 111 within the storage system is reduced.

The storage control system 12 can also have functions for advance allocation of a specific block range of a specific logical device 112 to areas usable as the work area for sort processing. The storage control device 12 can receive instructions for advance allocation of such work area from, for example, the management equipment 14.

Figure 7:
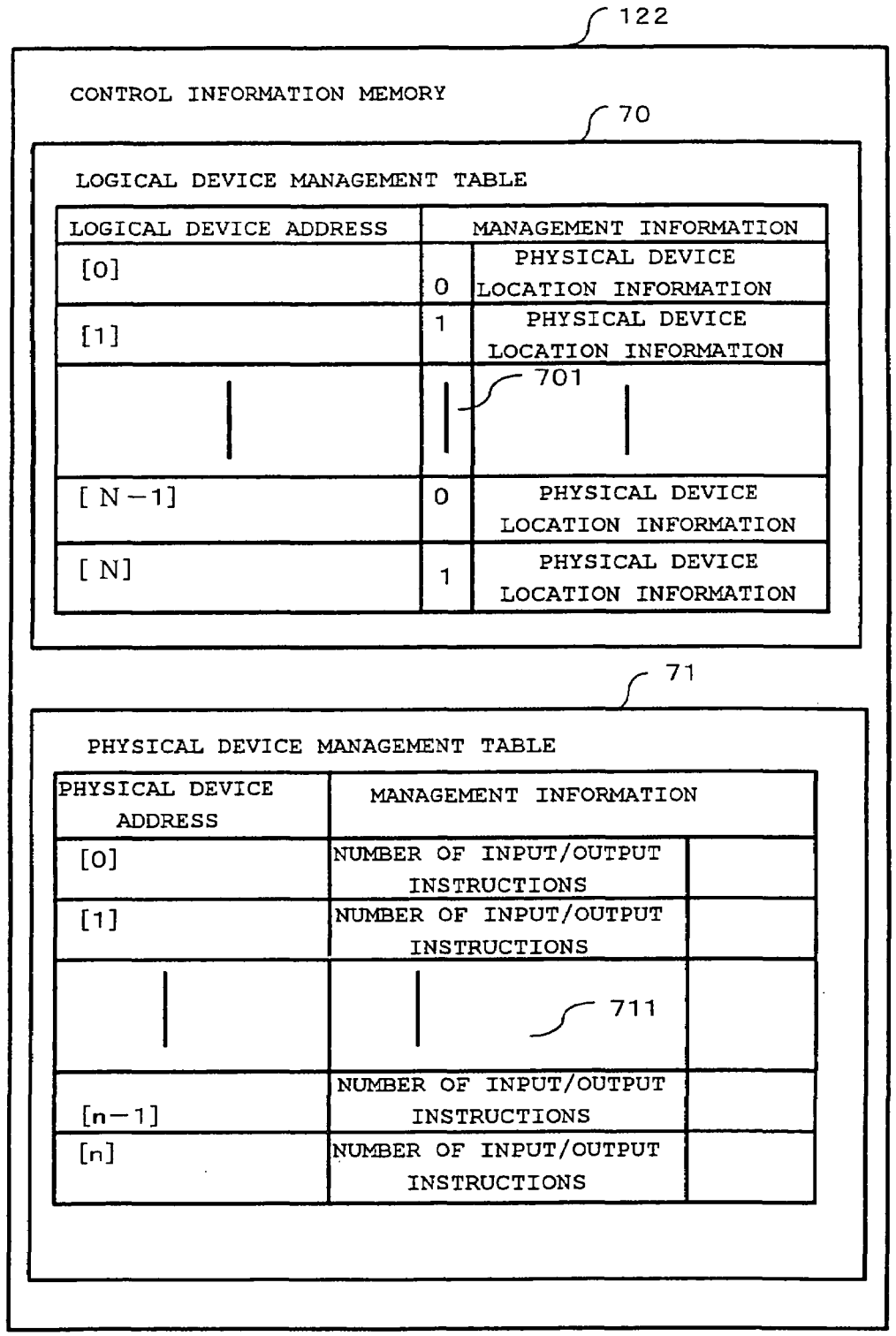
FIG. 7 shows the configuration of the logical device management table 70 and physical device management table 71 within the control information memory 122.

It is necessary to prohibit access by the host device 1 to the block range of the logical device 112 allocated in advance as a work area. In order to control this access prohibition, as shown in the example of FIG. 7, a logical device management table 70 which represents the states of each logical device 112 is stored in the control information memory 122, and an access prohibition flag 701 indicating whether access is prohibited can be set by the host device 1 in the logical device management table 70 for each logical device 112. In the example of a logical device management table 70 shown in FIG. 7, management information is recorded corresponding to the logical device addresses of each of the logical devices 112; this management information comprises the access prohibition flag 701, and information indicating the location of the physical device 111 in which the logical device 112 exists (for example, the physical device address of the physical device 111 and the block range (track number range) within the physical device 111). A value "1" for the access prohibition flag 701 signifies that access by the host device 1 is prohibited, and a value "0" indicates that access is not prohibited.

When the management equipment 14 selects an arbitrary logical device 112 as a work area for sort processing, the storage control device 12 is notified of the logical device address and value "1" of the access prohibition flag 701 for the selected logical device 112. The storage control device 12 sets the access prohibition flag 701 in the logical device management table 70 within the control information memory 122, corresponding to the logical device address of the notification, to the notification value of "1". The storage control device 12 references the logical device management table 70, and prohibits use by the host device of logical devices 112 for which the access prohibition flag 701 is set to the value "1". By this means, one or more sort-work addresses 405 and sort-work ranges 406 are secured in advance as work areas for sort processing. In this state, when the storage control device 12 receives a plurality of sort processing execution instructions with overlapping sort-work addresses 405 and sort-work ranges 406 from one or a plurality of host devices 1, a storage area in a logical device 112 secured in advance as a work area can be used as a substitute for the sort-work address 405 and sort-work range 406 specified by any of the sort processing execution instructions. In this case, the storage control device 12 replaces the specified sort-work address 405 and sort-work range 406 with the logical device address and block range of the storage area to be used as the substitute. In this way, [a plurality of] sort operations can be executed simultaneously.

When a substitute work area is selected as described above from among one or more logical devices 112 secured in advance for work areas, the storage control device 12 can perform operations such as the following. The storage control device 12 references the logical device management table 70 and physical device management table 71 in the control information memory 122, as indicated in FIG. 7. The physical device management table 71 comprises, in correspondence with the physical devices which are the addresses of the respective physical devices 111, the number of past data input/output instructions for each of the physical devices 111 (that is, the usage load amounts for each of the physical devices 111) 711. This number of input/output instructions 711 is recorded by the storage control device 12, which continuously counts the data input/output instructions received for each physical device 111. Based on the logical device management table 70 and the physical device management table 71, the storage control device 12 narrows down the storage areas of the logical devices 112 secured in advance to enable use as work areas, as candidates for selection, to only those storage areas existing on physical devices 111 different from the physical devices 131 on which exist the logical devices 112 indicated by the sort-in address 401 and sort-out address 403 specified by the sort processing execution request. The storage control device 12 then references the number of input/output instructions 711 of the physical devices 111 on which exist the storage areas resulting from the narrowing-down, and selects, as the substitute work area, a storage area existing on the physical device 111 with the smallest number of input/output instructions 711. The storage control device 12 then sets the logical device address and block range of the selected substitute work area as the sort-work address 405 and the sort-work range 406 in the parameter set shown in FIG. 4. By thus giving priority to storage areas existing on a physical device 131 with a relatively low past usage load in allocating a work area, unevenness in usage load amounts of storage areas can be alleviated. Also, contention for access of physical devices 111 is reduced.

The above-described sort processing can of course be performed during intervals in which the host device 1 is not performing online services. However, sort processing can be executed in parallel with online service processing. Below, operations in cases where sort processing is executed during online service processing are explained.

As shown in FIG. 2, when a record 21 is nearly created in a certain logical device 112, the storage control device 12 allocates a unique ID 214 within the logical device 112 to each such record 21, and records the record ID 214 for each record 21. That is, on receiving a data access instruction from the host device 1, the storage control device 12 judges whether the instruction is an instruction to create a new record. If the result of the judgment is true, the storage control device 12 appends a unique ID 214 to the end of the data of the record 21 transferred from the host device 1. If on the other hand the judgment result is false, the storage control device 12 executes access according to the instruction, but performs no action relating to the unique ID 214. Hence the unique ID 214 for each record 21 does not change when the record 21 is updated. The storage control device 12 executes sort processing for records 21 comprising unique IDs 214, but does not change the unique IDs 214 during the sort processing. Hence upon completing sort processing, the storage control device 12 can determine the position after sorting of a desired record 21 by retrieving the unique ID 214 for the record 21 from the sort-out range 404 of the sort-out address 403.

Figure 8:
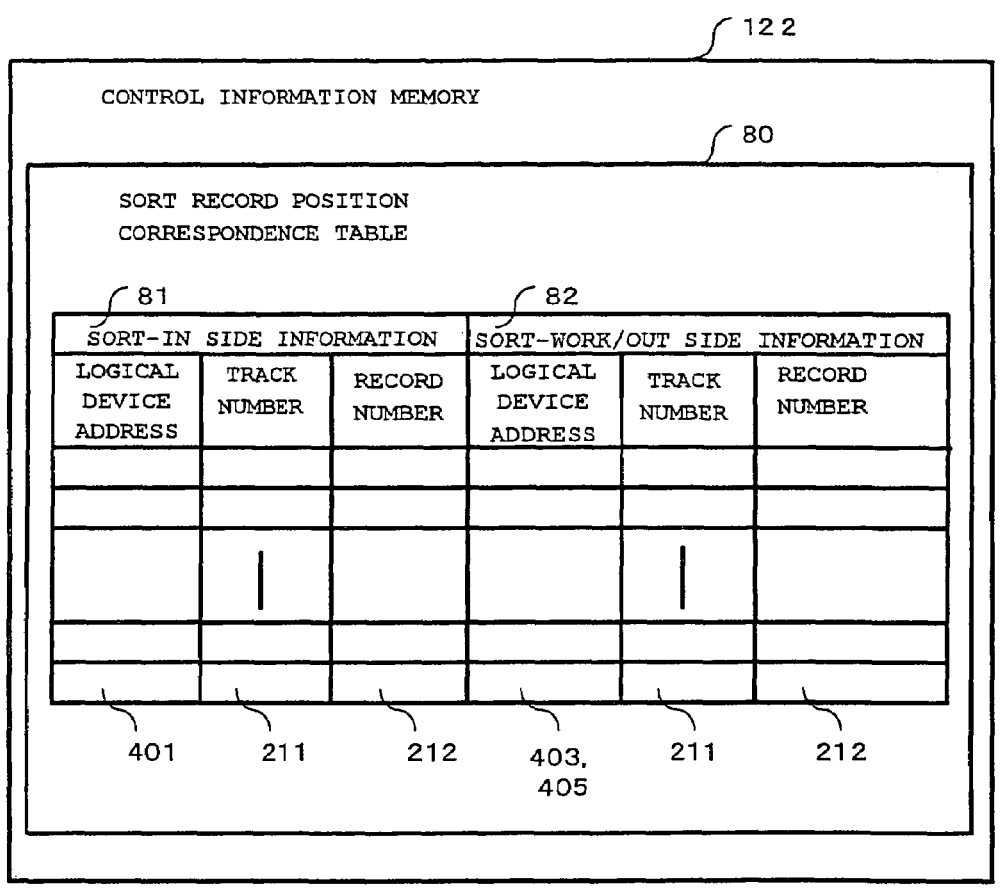
FIG. 8 shows the configuration of the sort record position correspondence table 80 within the control information memory 122.

Further, the storage control device 12 sets a sort record position correspondence table 80 such as that shown in FIG. 8 in the control information memory 122. Sort-in side information 81 and sort-work/out side information 82 are recorded, in mutual association, in the sort record position correspondence table 80. In the sort-in side information 81 are recorded the logical track numbers 211 and record numbers 212 within the sort-in address 401 of all the records 21 existing in the sort range 402 of the sort-in address 401 (that is, all the records 21 for sorting). In the sort-work/out side information 82 are recorded the logical track numbers 211 and record numbers 212 in the sort-out address 403 or sort-work address 405 of all the records 21 for sorting (for records 21 which exist at the sort-out address 403 during sorting, the number in the sort-out address 403; for records 21 which do not exist in the sort-out address 403 but exist in the sort-work address 405, the number in the sort-work address 405). By using the sort record position correspondence table 80, the storage control device 12 can determine to which record 21 in the logical track number 211 and record number 212 within the sort-out range 404 of the sort-out address 403, or in the logical track number 211 and record number 212 within the sort-work range 406 of the sort-work address 405, the record 21 uniquely determined by the logical track number 211 and record number 212 in the sort range 402 of the sort-in address 401 corresponds.

Figure 9:
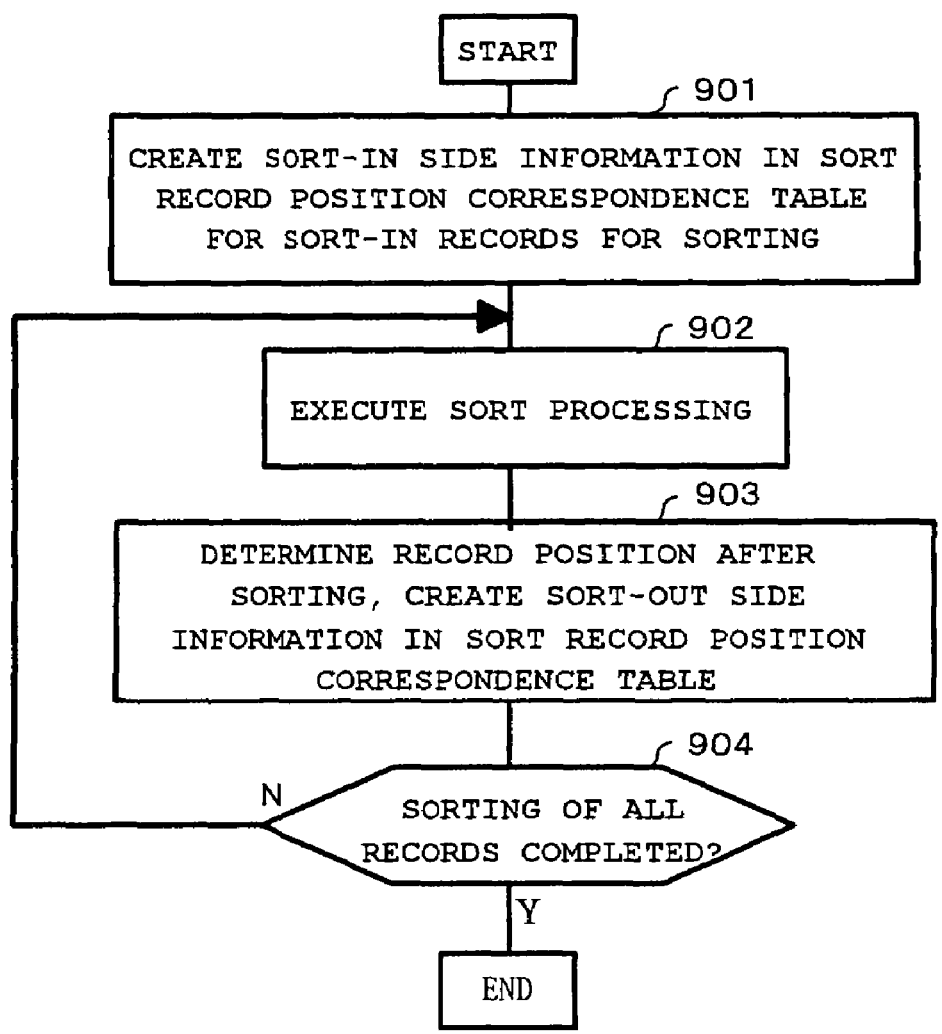
FIG. 9 shows the flow of processing in which the storage control device 12 creates a sort record position correspondence table 80.

FIG. 9 shows the flow of processing in which the storage control device 12 creates a sort record position correspondence table 80.

In step 901 of FIG. 9, the storage control device 12 registers all the records 21 for sorting in the sort-in side information 81. The registered information is the sort-in address 401, track number 211 within the sort-in address 401, and the record number 212 within the track 20. In step 902, the sort processing is executed. During sort processing or after sort processing, in step 903 the storage control device 12 determines the position after sorting of each record 21 and registers [the position] in the sort-work/out side information 82. The registered information comprises the sort-work address 405 or sort-out address 403, the track number 211 in the sort-work address 405 or the sort-out address 403, and the record number 212 in the track 20. In step 904, the storage control device 12 checks whether sort processing is completed, and if not completed control returns to step 902. In this way, during or after completion of sort processing, the sort record position correspondence table 80 is created.

Figure 10:
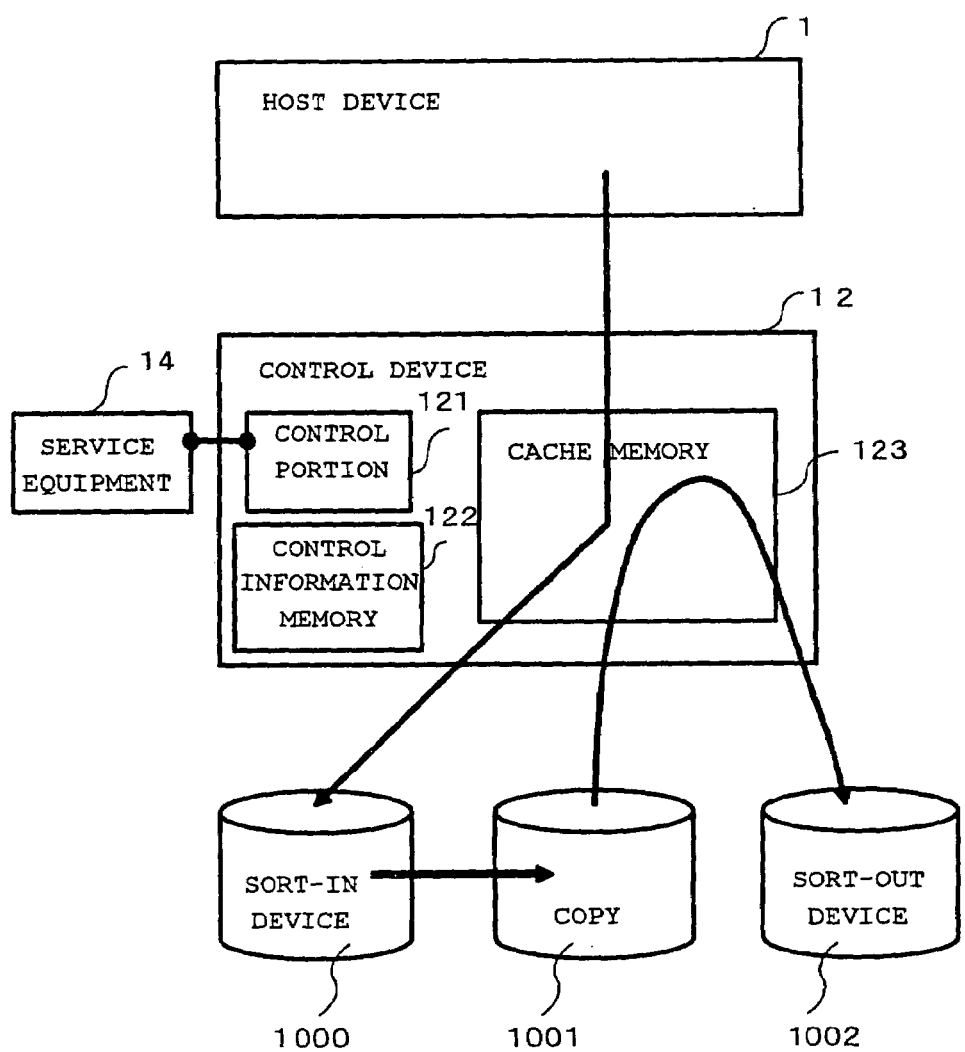
FIG. 10 shows in summary operations in sort processing by the storage control device 12 during online service.

FIG. 10 shows in summary an example of operations to perform background sort processing by the storage control device 12 during online service.

As shown in FIG. 10, the storage control device 12 has a copy function to create a copy 1001 of an arbitrary logical device 1000, and a snapshot function to reflect only an updated record 21 in a copy 1001 when a record 21 in a logical device 1000 has been updated after creation of a copy 1001. The storage control device 12 handles the copy 1001 of a logical device for sorting (hereafter called the "sort-in") 1000 as the logical device specified by the sort-in address in the above-described sort processing. During online service, when any of the records 21 in the sort-in 1000 is updated, the storage control device 12 reflects the update of the record 21 in the copy 1001. Further, the storage control device 12 executes sorting of the updated record 21 in the copy 1001 in synchronization with the update processing of the record 21 of the copy 1001, and stores the sorted record 21 in another logical device (hereafter called the "sort-out") 1002.

Figure 11:
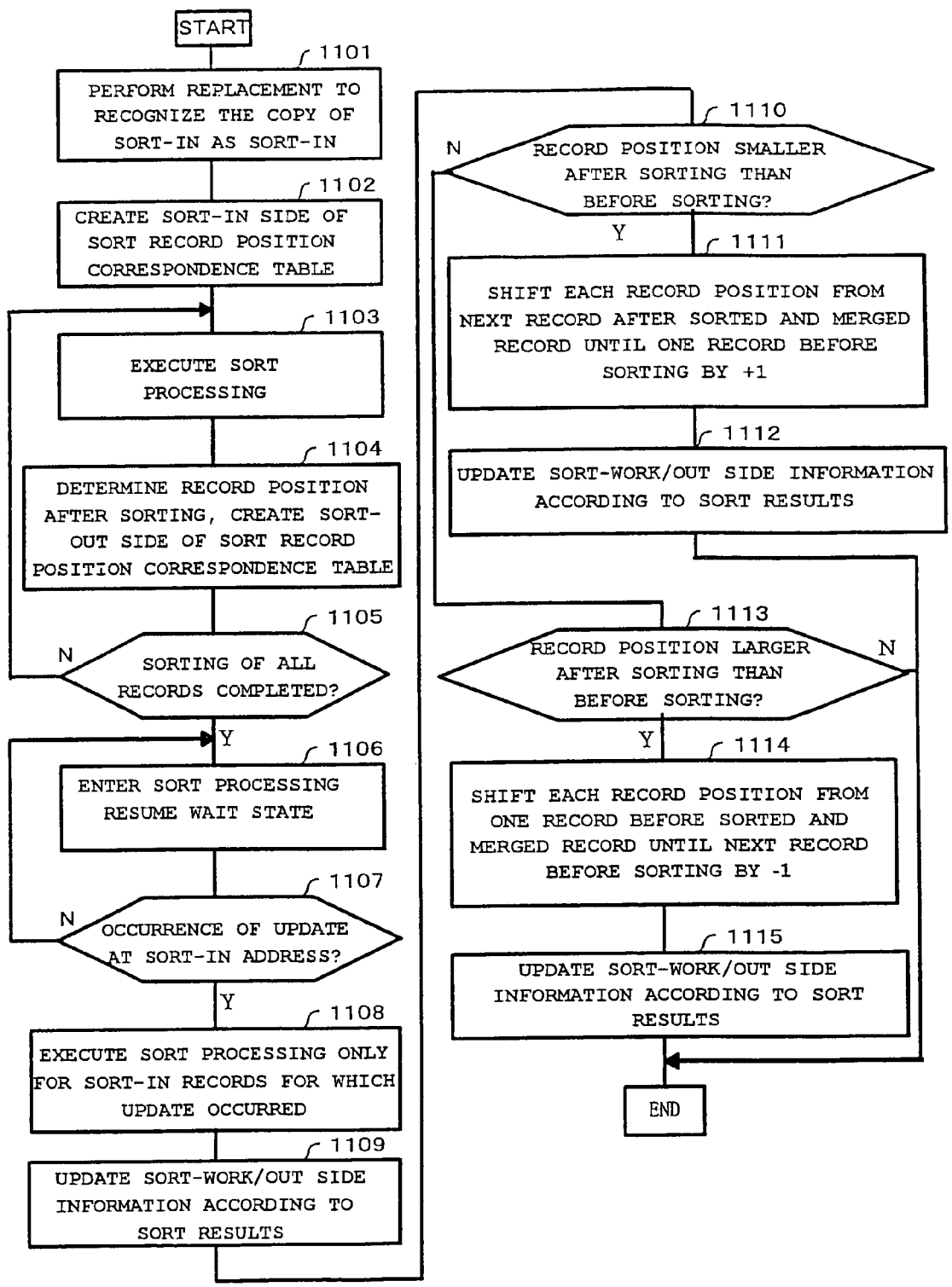
FIG. 11 shows the flow of operations in sort processing by the storage control device 12 during online service; and, FIG. 12 shows an example of another configuration of a storage system to which this invention is applied.

FIG. 11 shows the flow of operations in background sort processing by the storage control device 12 during online service.

In step 1101 of FIG. 11, the storage control device 12 recognizes the copy 1001 of the logical address 1000 specified as sort-in as the sort-in, and sets the address of the copy 1001 as the sort-in address 401. In step 1102, setting of the above-described sort record position correspondence table 80 is performed. That is, the storage control device 12 registers all the records for sorting (the records in the copy 1001) 21 in the sort-in side information 81 of the sort record position correspondence table 80. The registered information comprises the sort-in address (address of the copy 1001) 401, the track numbers 211 in the copy 1001, and the record numbers 212 in the tracks 211. In step 1103, sort processing is executed. During or after completion of sort processing, in step 1104 the storage control device 12 determines the positions of records 21 after sorting, and registers the information in the sort-work/out side information 82 of the sort record position correspondence table 80. The registered contents comprise the sort-work address 405 or sort-out address 403, the track numbers 211 in the sort-work address 405 or the sort-out address 403, and the record numbers 213 in the tracks 211. In step 1105, a check is performed to determine whether sort processing is completed, and if not completed, control returns to step 1103. In this way, during or after sort processing completion, the sort record position correspondence table 80 is created.

In step 1106, the storage control device 12 is in a state in which sorting can always be resumed, even after sort processing has been completed.

In step 1107, the storage control device 12 checks whether record updates have occurred in the copy 1001, that is, at the sort-in address. If updates have occurred, control proceeds to step 1108, and the storage control device 12 executes sort processing only of records 21 at record numbers 212 of track numbers 211 in the sort-in address which have been updated. In this sort processing only of updated records 21, the records 21 to be sorted are written to new positions after sorting in the sort-work address or in the sort-out address. In addition, the IDs of the records 21 for sorting are used to detect and erase records 21 remaining at positions prior to sorting in the sort-work address or the sort-out address. In this way, updated records 21 are merged in the sort-work address or sort-out address so as to be arranged in the correct order with the other records 21.

In step 1109, during or after sort processing only of the above updated records 21, the storage control device 12 updates the record positions recorded in the sort-work/out side information 82 of the sort record position correspondence table 80 (the track number 211 and record number 212 in the sort-work address or sort-out address), for records which have just been merged.

In step 1110, the storage control device 12 checks whether updated record positions 211, 212 in the work/out side information 82 of records 21 which have just been merged are smaller than before the update. If the result of the check is affirmative, control proceeds to step 1111. In step 1111, the storage control device 12, as one stage of sort processing, shifts in the direction to change by −1 the record numbers 212 of all records 21 positioned in the range from the record position following a record 21 which has just been merged in the sort-work address or the sort-out address, to the record position one before the record position indicated by the sort-work/out side information 82 before sorting of the just-merged record 21, and writes [the result] to the sort-work address or to the sort-out address. Accompanying this operation, in step 1115 the storage control device 12 updates the sort-work/out side information 82 in the sort record position correspondence table 80 for the records 21 the record numbers 212 of which have been updated in step 1114.

In step 1113, the storage control device 12 checks whether the updated record positions 211, 212 within the sort-work/out side information 82 for records which have just been merged are larger than prior to the update. If the check result is affirmative, control proceeds to step 1114. In step 1114, the storage control device 12, as one stage of the sort processing, shifts in the direction to change by −1 the record numbers 212 of all records 21 positioned in the range from the record position preceding a record 21 which has just been merged in the sort-work address or the sort-out address, to the record position one after the record position indicated by the sort-work/out side information 82 before sorting of the just-merged record 21, and writes [the result] to the sort-work address or to the sort-out address. Accompanying this operation, in step 1115 the storage control device 12 updates the sort-work/out side information 82 in the sort record position correspondence table 80 for the records 21 the record numbers 212 of which have been updated in step 1114.

In the manner described above, during online service, sort processing limited only to updated records is performed. By this means, sort processing can be performed in parallel with online service, without substantially impeding online service. The sort processing of updated data during online service shown in steps 1108 to 1105 in FIG. 11 can be performed not only after completion of copy sort processing indicated in steps 1101 to 1104, but also when block updates occur during execution of copy sort processing.

As already explained, a method can be employed in which sort processing can be performed not only upon a command from the host device 1, but upon a command from the management equipment 14 as well. By notifying the storage control device 12 of a parameter set 40 such as that shown in FIG. 4, the management equipment can cause the storage control device 12 to perform sort processing according to the parameter set 40. When sort processing due to an instruction from the management equipment 14 is completed, the storage control device 12 can report the completion of sort processing to the host device 1 as well as to the management equipment 14.

Further, a method can also be employed in which processing to secure in advance a logical device as a work area for sort processing, as described above, can be performed not only upon an instruction from the management equipment 14, but also upon an instruction from the host device 1. Regardless of the origination of the command due to which processing to secure a logical device is performed, the storage control device 12 can report which logical device has been secured to the management equipment 14 and to the host device 1.

Figure 12:
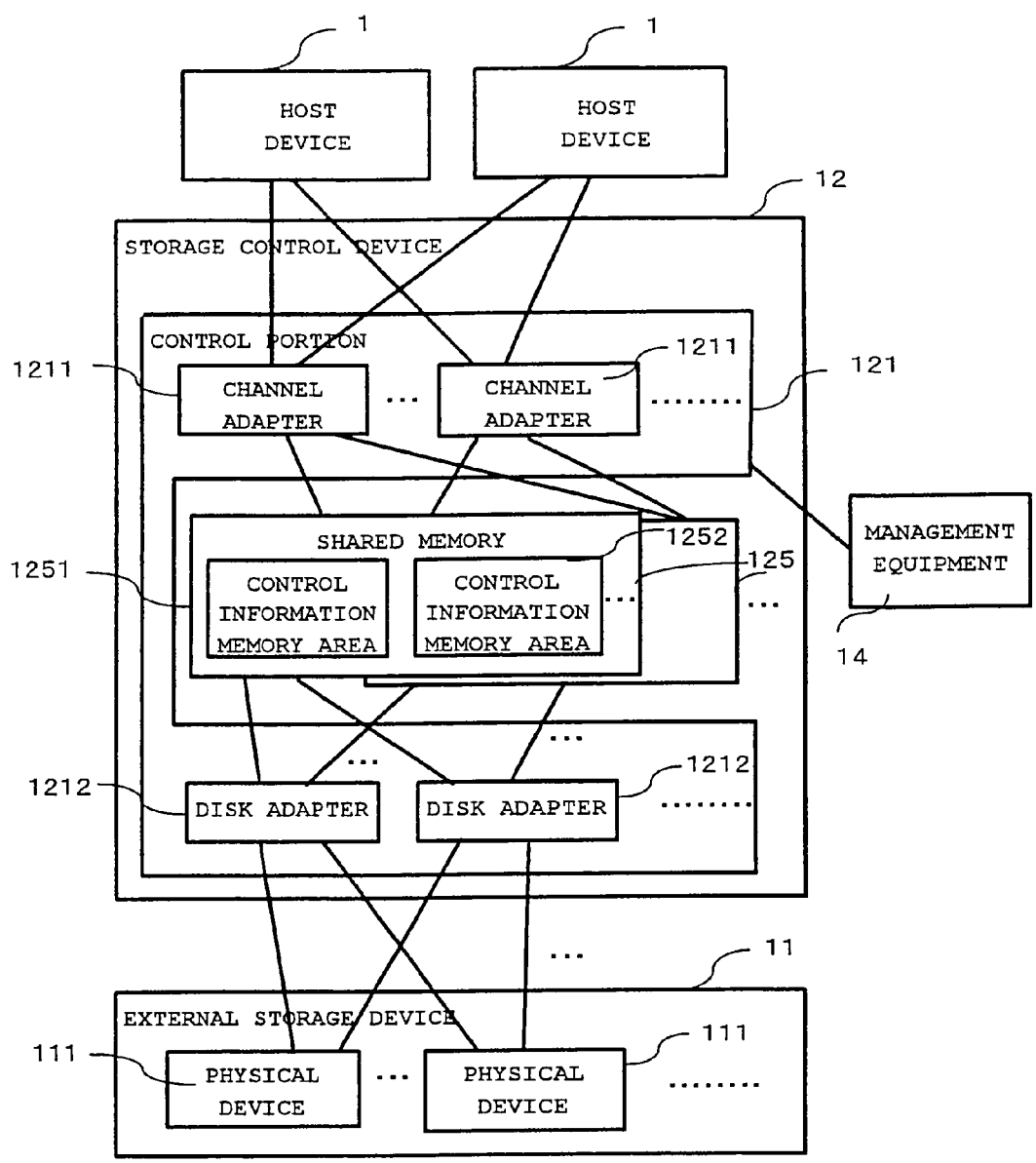

The configuration of a storage system 2 to which this invention is applied need not be similar to that shown in FIG. 1, and this invention can also be applied to storage systems with other configurations. FIG. 12 shows one example of another configuration of a storage system to which this invention can be applied. In the configuration example of FIG. 12, a plurality of host devices 1 are connected to the storage control device 12. The storage control device 12 comprises a control portion 121, and a plurality of shared memory units 125 connected thereto. The control portion 121 has a plurality of channel adapters 1211 and a plurality of disk adapters 1212. Each channel adapter 1211 is connected to [all of] the host devices 1 and all of the shared memory units 125, and controls communication with the host devices 1 and processing of data and commands transmitted to and from the host devices 1. Each of the disk adaptors 1212 is connected to all of the shared memory units 125 and all of the physical devices 111 in the external storage device 11, and controls communication with the physical device 111 and processing of data and commands transmitted to and from the physical devices 111. [Each of] the shared memory units 125 comprises a control information memory area 1251 used for purposes similar to those of the control information memory 122 shown in FIG. 1, and a cache memory area 1252 used for purposes similar to those of the cache memory 123 shown in FIG. 1. In a storage system with such a configuration also, through control by the storage control device 12 as explained above, sort processing can be performed without greatly affecting data input/output in online services by the host devices 1.

In the above-described aspects, the storage system 2 has a configuration in which cache memory is used as shown in FIG. 1; but of course this invention can also be applied to storage systems with other configurations. For example, FIG. 12 shows another example of a storage system configuration, to which this invention can also be applied.

In the above, aspects of this invention have been explained, but these are examples used to explain the invention, and the scope of this invention is not limited to the above aspects. This invention can be implemented in various modes other than those of the above aspects.

What is claimed is:

1. A storage system, connectable via a communication channel to one or more host devices, comprising an external storage device having one or more physical devices to store data for input from and output to said host devices and a storage control device which controls transfer of said data between said host devices and said external storage device, wherein:

said storage control device has cache memory which temporarily holds one or more blocks of said data, control information memory which stores control information, and a control portion which is connected to said host devices, said external storage device, said cache memory, and said control information memory, defines each of one or more sets of blocks of said data stored in said external storage device as one or more logical devices, and controls the input and output of said blocks to and from said external storage device, said cache memory, and said host devices;

said control portion has one or more processors which receive sort processing execution instructions from said host devices and perform sort processing;

said one or more processors are notified, by means of said sort processing execution instructions, of sort-in information specifying an arbitrary block group within an arbitrary logical device as a sort-in block group, key information specifying data at an arbitrary position in said blocks as a sort key, sort-work information specifying an arbitrary block group in an arbitrary logical device as a sort-work block group, and sort-out information specifying an arbitrary block group in an arbitrary logical device as a sort-out block group; and, said one or more processors, when executing said sort processing in response to said sort processing execution instructions, write said specified sort-in block group in said external storage device to said cache memory, and while using said specified sort-work block group as a work area, sort said specified sort-in block group written to said cache memory based on said specified sort key, store said sorted sort-in block group to said specified sort-out block group, and notify said host devices of the completion of said sort processing.

2. The storage system according to claim 1, further comprising management equipment, connected to said control portion, capable of the visual display of input/output information of said control information memory, and wherein said one or more processors are constructed so as to be able to receive said sort processing execution instructions from said management equipment as well as from said host devices, and to perform said sort processing.

3. The storage system according to claim 1, wherein:

said sort-in information comprises a sort-in address which indicates the address of the logical device in which said sort-in block group exists, and a sort range which indicates the location range in which said sort-in block group exists in said logical device identified by said sort-in address;

said sort-work information comprises a sort-work address which indicates the address of the logical device in which said sort-work block group exists, and a sort-work range which indicates the location range in which said sort-work block group exists in said logical device identified by said sort-work address; and, said sort-out information comprises a sort-out address which indicates the address of the logical device in which said sort-out block group exists, and a sort-out range which indicates the location range in which said sort-out block group exists in said logical device identified by said sort-out address.

4. The storage system according to claim 1, wherein, when said sort-work information transmitted by said sort processing execution instruction has an invalid value, said one or more processors secure in said cache memory a substitute storage area for the sort-work block group specified by said sort-work information, and use said substitute storage area in said cache memory as said work area.

5. The storage system according to claim 1, further comprising management equipment which is connected to said control portion can visually display input and output information of said control information memory, and wherein:

said management equipment can output, to said control portion, a reservation instruction specifying an arbitrary logical device or an arbitrary block group in an arbitrary logical device as a reserved area to be secured in advance for use as said work area; and, said one or more processors of said control portion, in response to said reservation instruction from said management equipment, stores access prohibition information for said reserved area specified by said reservation instruction in said control information memory, and based on said access prohibition information in said control information memory, limits data input/output of said reserved area by host devices, and, on receiving a plurality of said sort processing execution instructions specifying said overlapping sort-work block groups, uses said reserved area as a substitute for any of said overlapping sort-work block groups, and by this means simultaneously executes said plurality of sort processing execution instructions.

6. The storage system according to claim 5, wherein:

said one or more processors monitor the usage states of said one or more physical devices in said external storage device through data input and output and store physical device usage information indicating usage load amounts of said one or more physical devices in said control information memory; and, when a plurality of said reserved areas are already secured and an area is to be selected from among said plurality of reserved areas for use as said substitute, said one or more processors select a logical device existing in a physical device for which said usage load amount is relatively low from among said plurality of reserved areas, based on said physical device usage information stored in said control information memory.

7. The storage system according to claim 1, wherein:

each of the blocks in said logical devices has a unique ID;

in sort processing of said sort-in block group in said external storage device, said one or more processors write sorted blocks of said sort-in block group to said sort-work block group or said sort-out block group, without changing the IDs thereof;

during execution or after completion of sort processing of said sort-in block group, when data of any of the blocks within said sort-in block group in said external storage device is updated during online service by said host devices, said one or more processors execute online sort processing of said blocks to be updated, during said online service; and, in said online sort processing, said one or more processors write said blocks to be updated to positions after sorting in said sort-work block group or said sort-out block group, and based on said IDs of said blocks to be updated, retrieve and erase blocks remaining in positions before sorting of said updated blocks, from said sort-work block group or said sort-out block group.

8. The storage system according to claim 1, wherein:

when sort processing of said sort-in block group in said external storage device is performed, said one or more processors record in said control information memory block position correspondence information indicating, in association, the position in said storage system of each block in said sort-in block group, and the position in said storage system of each block in said sort-work block group or said sort-out block group corresponding to each block in said sort-in block group;

during execution or after completion of sort processing of said sort-in block group, when the data of any of the blocks within said sort-in block group in said external storage device is updated during online service of said host devices, said one or more processors execute online sort processing of said blocks to be updated, during said online service; and, in said online sort processing, said one or more processors write said blocks to be updated to the positions after sorting in said sort-work block group or in said sort-out block group and, based on said block position correspondence information, retrieve and erase blocks remaining in positions prior to sorting of said updated blocks from within said sort-work block group or said sort-out block group, and update said block position correspondence information so as to correct the positions of said blocks to be updated within said sort-work block group or said sort-out block group from said position prior to sorting to said position after sorting.

9. The storage system according to claim 1, wherein:

said one or more processors create a copy of an arbitrary logical device, and when a block in the original logical device is updated during online service of said host devices after creation of said copy, perform processing to reflect the update of said block within said original logical device in the block in said copy during said online service; and, said one or more processors regard the block group in said copy as said sort-in block group, and thereafter, when an update of said blocks in said original logical device is reflected in the blocks in said copy during said online service, execute sort processing of said blocks reflecting said update in said copy during said online service.

* * * * *